United States Patent [19]
Tzeng et al.

[11] Patent Number: 5,893,153
[45] Date of Patent: Apr. 6, 1999

[54] METHOD AND APPARATUS FOR PREVENTING A RACE CONDITION AND MAINTAINING CACHE COHERENCY IN A PROCESSOR WITH INTEGRATED CACHE MEMORY AND INPUT/OUTPUT CONTROL

[75] Inventors: Tzungren A. Tzeng, San Jose; Kevin Normoyle, Santa Clara, both of Calif.

[73] Assignee: Sun Microsystems, Inc., Pala Alto, Calif.

[21] Appl. No.: 691,783

[22] Filed: Aug. 2, 1996

[51] Int. Cl.$^6$ .............................. G06F 13/18; G06F 12/00
[52] U.S. Cl. ............................ 711/141; 711/151; 395/842
[58] Field of Search ...................... 395/468, 470, 395/478, 860, 842; 711/141, 143, 151

[56] References Cited

U.S. PATENT DOCUMENTS

| | | | |
|---|---|---|---|
| 5,325,503 | 6/1994 | Stevens et al. | 395/425 |
| 5,339,399 | 8/1994 | Lee et al. | 395/425 |
| 5,553,268 | 9/1996 | Willenz et al. | 395/485 |
| 5,557,769 | 9/1996 | Bailey et al. | 395/473 |
| 5,655,145 | 8/1997 | Chejlava, Jr. et al. | 395/821 |

*Primary Examiner*—Tod R. Swann
*Assistant Examiner*—Christopher S. Chow
*Attorney, Agent, or Firm*—Townsend and Townsend and Crew LLP

[57] ABSTRACT

An integrated processor includes an on-chip integrated input/output (IO) system (which does not have a on-chip bus) to handle direct memory access (DMA) operations from external IO units and interface with external cache and main memories. The integrated IO system includes an external cache controller that controls access to both the cache and main memory so as to maintain coherency between the cache and main memory. As part of maintaining data coherency, the cache controller prevents race conditions between instructions generated from a core logic unit within the microprocessor and DMA instructions generated from an external IO unit by giving the DMA request priority over the CPU instructions.

18 Claims, 3 Drawing Sheets

| SEQUENCE | EVENT D3 ARRIVES AT ECU 30 BEFORE EVENT F1 | EVENT F1 ARRIVES AT ECU 30 BEFORE INSTRUCTION D BUT IS NOT PROCESSED | EVENT F1 ARRIVES AT ECU 30 AND IS INVOLVED IN LINE FILL OPERATION BEFORE EVENT D3 ARRIVES |
|---|---|---|---|
| OUTCOME | EVENT D3 IS PROCESSED FIRST | EVENT D3 IS PROCESSED FIRST | LINE FILL EVENT (F1) IS PROCESSED FIRST. EVENT D3 IS HELD AND SNOOPS LATER |

METHOD AND APPARATUS FOR PREVENTING A RACE CONDITION AND MAINTAINING CACHE COHERENCY IN A PROCESSOR WITH INTEGRATED CACHE MEMORY AND INPUT/OUTPUT CONTROL

BACKGROUND OF THE INVENTION

The present invention relates to a single-chip integrated microprocessor that interfaces directly with external memories and external input/output units. More specifically, the present invention relates to an apparatus and method for ensuring cache coherency in such a microprocessor.

Figure 1:
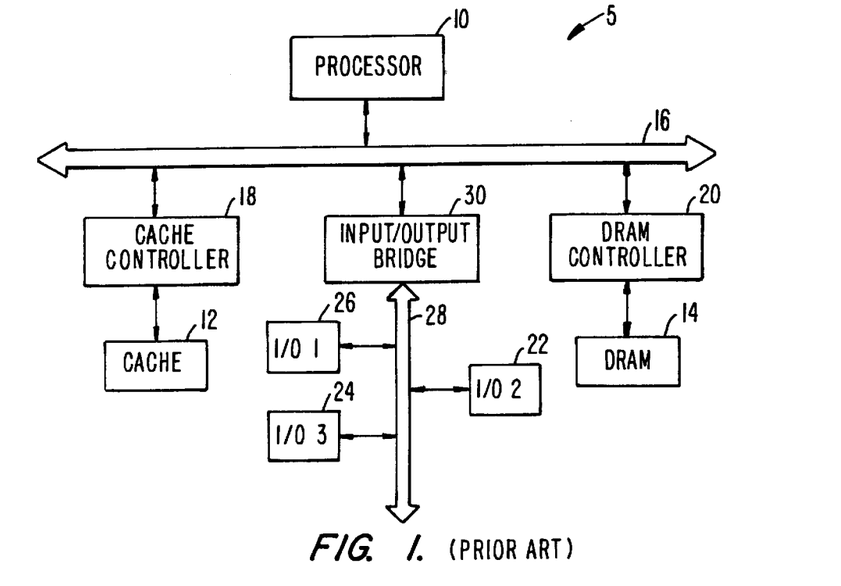
FIG. 1 is a simplified block diagram of a multiprocessor computer system according to the prior art.

Microprocessors that share and exchange data stored in external memories, such as cache and main memories, with one or more external input/output units are commonplace in today's computing environment. Such a microprocessor system 5 is shown in FIG. 1 and may include a processor 10, a cache memory 12 and a main memory (e.g., a DRAM) 14 communicatively coupled through a bus 16. A cache controller 18 interfaces cache 12 to bus 16 and a main memory controller 20 interfaces memory 14 to bus 16.

Most conventional processors, such as processor 10, have some onchip input/output (I/O) support logic but rely on one or more external components to complete an I/O system for complex bus interfaces between external input/output (I/O) devices, such as I/O devices 22, 24 and 26, which also communicate with memories 12 and 14 through bus 16. Such external components may include an input/output bridge unit 30. Bridge unit 30 controls access of such external I/O devices to bus 16, and a second bus system 28 connects the I/O devices to input/output bridge 30. Second bus system 28 includes an arbitration system that prioritizes access of I/O devices 22, 24 and 26 to the bus. Second bus system 28 may be an industry standard bus system such as the PCI bus protocol. External I/O devices 22, 24 and 26 may be, for example, a graphics/multimedia card, a communication device and an audio card.

Bus 16 preserves coherency between cache 12 and memory 14 through the manipulation of various status bits such as modified, shared, exclusive and invalid bits associated with each memory location. Bus 16 may be a proprietary bus, such as Sun Microsystem's S-Bus. It is common for the functionality of each of the above units in computer system 5 to be implemented on different chips. For example, processor 10, cache 12, main memory 14, cache controller 18, main memory controller 20 and input/output bridge 30 may all be on separate chips. Thus, such systems are referred to as multichip computer systems.

Such multichip solutions are typically connected with standard buses (e.g., a PCI bus as discussed above), which cause a de facto ordering of coherency events. Also, in such multichip solutions, direct memory access (DMA) requests from external I/O devices, such as devices 22–26, do not generally access cache 12. Instead, such instructions generally go directly to main memory 14.

Because of market and technology demands, chip designers are putting more and more functionality of microprocessor system 5 shown in FIG. 1 on a single chip as an integrated processor. A single-chip processor has reduced latency time because signals are not shuttled between as many components, is less expensive to manufacture and saves considerable space in that area is not required for connection of as many multiple components. In such an integrated processor, however, data coherency between the various external cache and main memories must still be retained to run existing software.

There is no de facto ordering when I/O, memory and cache interfaces are all on a single chip. Instead, a design based around chip-level issues rather than system interconnect issues becomes optimal in terms of chip area used and overall performance. It is possible in such an integrated processor to incorporate a bus similar to bus 16 on the integrated processor to preserve data integrity. Chip size and performance issues make such a tactic undesirable for many applications, however. For example, the chip area required by such a bus system with its handshaking logic, etc. is substantial. Also, latency delays and the upkeep required with such a data coherency bus, results in undesirable speed penalties. Accordingly, other methods of maintaining data coherency in such integrated processors are desirable.

SUMMARY OF THE INVENTION

The present invention provides a single-chip integrated processor that directly interfaces with external input/output devices and external memories while retaining data integrity between the memories. The present invention ensures such data integrity without significantly increasing chip size and without suffering significant speed penalties as would be incurred with an on-chip bus system.

An integrated microprocessor according to the present invention includes a core logic unit and an integrated input/output system. The integrated input/output system includes a memory control unit that interfaces with and exchanges data with an external main memory, a bus interface unit that interfaces with and exchanges data with external input/output devices and an external cache controller that interfaces with and exchanges data with an external cache. The integrated input/output system is configured to maintain data coherency, and prevent possible race conditions between memory requests from the core logic unit and direct memory access DMA requests from external input/output units. When an instruction from the core logic unit and a DMA request from an external input/output unit are simultaneously present at the external cache controller, the integrated input/output system maintains data coherency by implementing a rule of procedure that prioritizes the DMA request over the core logic unit instruction.

For example, in one embodiment the integrated input/output system moves DMA instructions ahead of instructions from the core logic unit in such a situation, and all pending writeback requests, or at least writeback requests to the same address accessed by the DMA request, are completed before the DMA request is executed. The core logic unit instruction is held until the DMA instruction is serviced. If the core logic unit instruction was already in the process of a line fill operation, however, the DMA request is held (e.g., by setting a status bit) until after the line fill operation in progress is completed. Many external I/O devices operate in real time. Moving DMA instructions ahead of instructions from the core logic unit has the added benefit of ensuring that the external I/O devices properly operate in such a real time environment.

The single solution provided by the present invention to data coherency issues allows equal access to cache and memory. This, in turn, results in performance enhancements where external I/O devices update the cache directly or receive data from the cache in situations where a multichip solution typically accesses the main memory instead.

The features and advantages of the present invention will be more clearly understood from the ensuing detailed description taken in conjunction with the accompanying drawings.

DESCRIPTION OF THE PREFERRED EMBODIMENT

Figure 2:
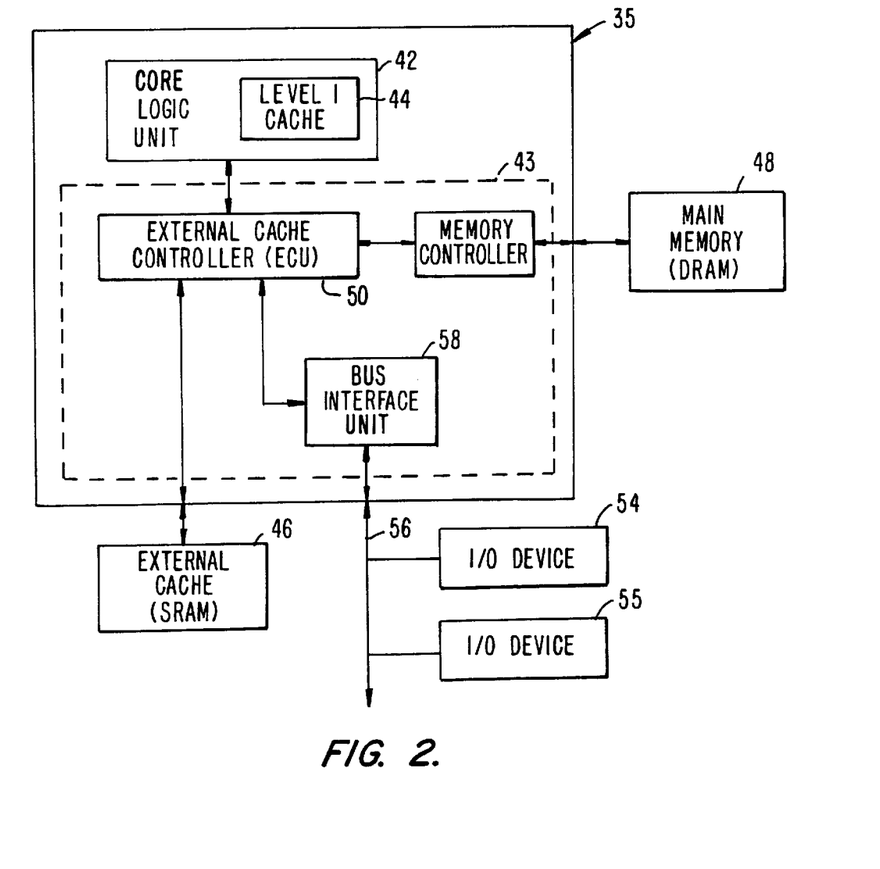
FIG. 2 is a simplified block diagram of one embodiment of a computer processor according to the present invention.

FIG. 2 is a simplified block diagram of a portion of a computer system containing the integrated processor according to the present invention. In FIG. 2, a single microprocessor 35 includes a core logic unit 42 and an integrated input/output system 43 all on a single monolithic integrated circuit.

Core logic unit 42 includes integer, floating point, graphics and other execution units (not shown). Core logic unit 42 also includes a high speed internal cache 44. Cache 44 is one of three memories that store data for the various execution units of logic unit 42. The other memories include an external cache 46 and a main memory 48. External cache 46 is preferably (but not necessarily) a high speed memory such as an SRAM, while main memory 48 is preferably (but not necessarily) a cost efficient memory such as a DRAM.

Cache 46 contains a complete copy of the contents of cache 44 and is thus an inclusive cache. Each memory location in cache 46 has associated status bits to indicate whether the data stored in that location is valid and whether or not an updated copy of the data is also stored in main memory 48. For example, in a preferred embodiment two status bits are associated with each location to specify whether the data in that location is either: 1) invalid (not updated, therefore main memory 48 must be referenced); 2) exclusive (updated in both cache 46 and main memory 48); and 3) modified (updated in cache 46, but not in main memory 48). Similar status bits are employed for cache 44 and main memory 48.

Core logic unit 42 interfaces with cache 46, main memory 48 and external input/output devices, such as I/O devices 54 and 55, through integrated input/output system 43. Integrated input/output system 43 includes an external cache controller (ECU) 50, a memory controller 52 and a bus interface unit 58, that together provide support for all input and output to microprocessor 35. ECU 50 and memory controller 52 are part of a memory reference execution unit in processor 35.

ECU 50 maintains data coherency between cache 44, cache 46 and main memory 48. When an address is updated in cache 44 by an instruction from core logic unit 42, data is written through from cache 44 to cache 46. When an address not stored in cache 44 is updated in cache 46, the address is directly updated in cache 46 and not allocated back to cache 44. When an address in cache 46 is updated by a DMA request, the data is written to cache 46 and then ECU 50 invalidates any corresponding entry in cache 44. If the required data is not in either cache 44 or cache 46, logic unit 42 checks main memory 48 and may update the caches as appropriate. When data is fetched from main memory 48, ECU 50 interfaces with memory controller 52 to retrieve the required data. ECU 50 maintains data coherency in situations that could result in race conditions as described in detail below.

Input/output units, such as I/O units 54 and 55, communicate with microprocessor 35 over a bus 56. Direct memory access (DMA) operations from I/O units 54 and 55 go from bus 56 to bus interface unit 58. Bus 56 includes an arbitration system that determines priority for individual units in situations where multiple I/O units attempt simultaneous access to the bus. In a preferred embodiment, bus 56 is a PCI bus, but of course bus 56 can use other protocols such as VESA or ISA protocols.

Microprocessor 35 and input/output devices such as device 54 generally operate in different clock domains (different, asynchronous clock frequencies). Bus interface unit 58 synchronizes data transfer between the various units of microprocessor 35 and input/output units connected to bus 56. Bus interface unit 58 operates in the same clock domain as the input/output devices, while CPU core 42, ECU 50 and memory controller 52 all operate in a separate clock domain. Specific details of the clock domains, bus interface unit 58 and the synchronization of signals between microprocessor 35 and input/output units connected to bus 56 are described in U.S. Ser. No. 081,660,026(Attorney Docket No. M-4057 US) filed Jun. 6, 1996 pending, entitled "Low-Latency, High-Throughput, Integrated Cache Coherent I/O System for a Single-Chip Processor," assigned to Sun Microsystems, Inc. and having Kevin B. Normoyle, Michael A. Csoppenszky, Jaybharat Boddu, Jui-Cheng Su, Alex S. Han, Rajasekhar Cherabuddi and Tzungren Tzeng as inventors, and which is hereby incorporated by reference for all purposes. Once synchronized, direct memory access (DMA) operations between the input/output devices to the three tier memory system of cache 44, cache 46 and memory 48 are handled by ECU 50 to maintain data coherency as described in more detail below.

Because of its quick access times and proximity to core logic unit 42, cache 44 is the first memory checked by core logic unit 42 in response to an instruction that reads or writes to memory. If the required memory address is not within cache 44, core logic unit 42 next references cache 46. Cache 44 is also referred to as a "level 1" cache and cache 46 as a "level 2" cache. If the data is not present in either the level one or two caches, core logic unit 42 requests the data from main memory 48.

Similarly, during DMA operations, input/output unit 54 first snoops on cache 46 through ECU 50. If the data is not present in cache 46, the DMA operation references main memory 48 through ECU 50. DMA operations write directly to main memory 48 in the event of a cache miss and in such a case data is not allocated back to the cache. Instructions from core logic unit 42, on the other hand, use a write allocate scheme that writes to cache 46 in the event of a cache miss. Potential problems that may comprise data coherency between the cache and main memories (i.e., race conditions) can arise when instructions from core logic unit 42 and an external I/O unit, such as I/O unit 54, simultaneously access the same memory location (simultaneous access refers to a second instruction attempting to access an address that is in the process of being accessed by an earlier instruction). In general, I/O read and write instructions and processor load and store instructions need to meet a model of behavior that creates an ordering of all reads/writes and loads/stores from both the processor and I/O devices. Such a model of behavior is typically required for systems that support cache-coherent input/output.

Figure 3:
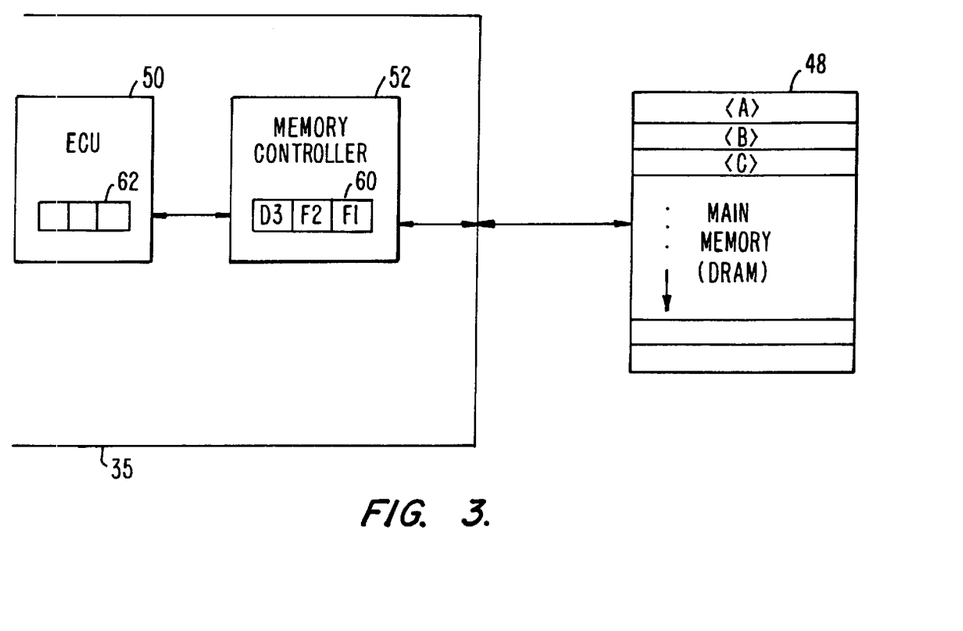
FIG. 3 is a block diagram of a part of the computer processor shown in FIG. 2.

For example, consider the following scenario of sequential instructions F1, F2 and D3. In this scenario, core logic unit 42 issues a load memory instruction (F1) that misses in both the level 1 and level 2 caches and thus accesses main memory 48 through a request to access a particular address <A>. A subsequent instruction, e.g., a fetch request (F2), from core 42 also misses in the level 1 and 2 caches and is passed on to memory 48. The third instruction (D3), which is subsequent to instruction F2, then comes in from I/O unit 54 and requests to write to location <A>. As shown in FIG. 3, these instructions are queued up in a queue 60 that holds instructions sent from ECU 50 and is part of memory controller 52. In one embodiment, queue 60 is three instructions deep. Without special implementation procedures or an appropriate model of behavior, both the F1 and F2 instructions are executed before instruction D3 from I/O unit 54.

In this scenario, data for address <A> is loaded from instruction F1, into the level 2 cache and marked exclusive. Instruction F2 is basically irrelevant to this scenario (except for its existence) and may fetch data from another address (e.g., location <B>). The DMA request from I/O unit 54 (instruction D3) initially misses in the level 2 cache and then accesses main memory 48 at location <A>. By then, however, location <A> is being written to by instruction F1 and is marked exclusive in the level 2 cache. Thus, by the time it took instruction D3 to get to the front of queue 60, instruction F1 had already accessed memory 48 and started writing the old value at address <A> into the level 2 cache. Without special precautions, this scenario thus results in cache 46 having an old version of data that was updated in main memory 48.

The present invention prevents this problem by making DMA requests bypass requests from core 42 when accessing main memory 48. The CPU requests are bypassed by moving the DMA requests to the front of the queue. Since the DMA requests and CPU requests both go through ECU 50 (which also includes a queue 62 as shown in FIG. 3), the proper order of the requests is actually set by ECU 50.

Moving DMA instructions ahead of processor instructions has the added benefit of ensuring a low-latency period that avoids I/O buffer overrun problems since there may be real-time devices on the I/O bus.

Figure 4:
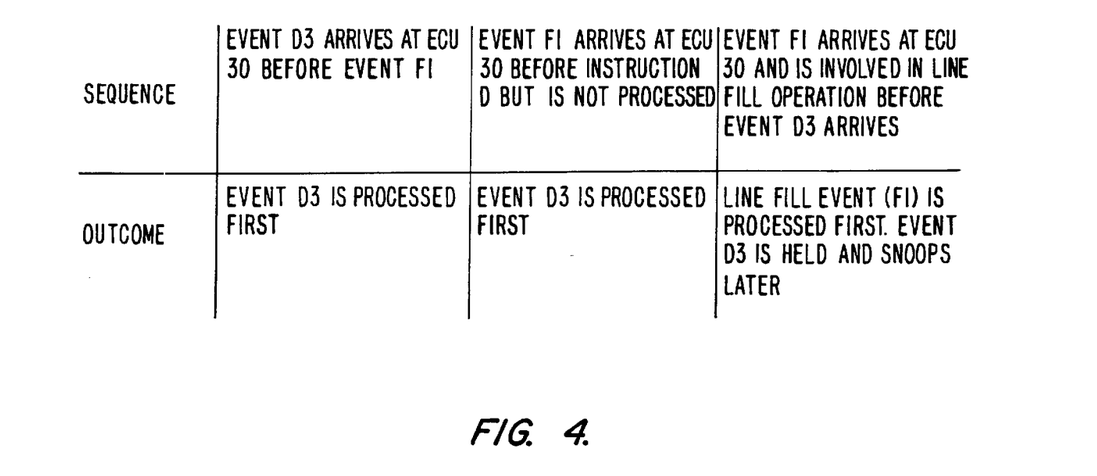
FIG. 4 is a timeline detailing the operation of the processor shown in FIG. 3 in certain situations.

In the event that instruction F1 is already writing to or otherwise accessing the level 2 cache (a line fill operation is already taking place), then the DMA request (instruction D3) is not moved to the front of the queue and instruction F1 is completed. A state machine within ECU 50 tracks whether a line fill operation (a data transfer operation between main memory 48 and cache 46) is going on for a particular address. A timeline for the above-described instruction processing is shown in FIG. 4 and further details are discussed below in relation to FIG. 5. In FIG. 4, instructions F1, F2 and D3 are in the process of being executed within processor 35. For convenience, the part of each instruction F1, F2 and F3 being executed by ECU 50 is referred to as event F1, F2 and D3, respectively.

As shown in FIG. 4, when the DMA request (event D3) reaches ECU 50 first, there is no special action is taken and the DMA request (event D3) is processed first. When the instruction from core 52 (event F1) reaches ECU 50 first and the DMA instruction (event D3) reaches ECU 50 before processing of the event F1 is initiated, ECU 50 moves the DMA instruction (event D3) to the front of queue 62 and event D3 is processed (accesses memory 48) first. If, however, the core instruction (event F1) reaches ECU 50 first and is already in a line fill operation, a status bit within queue 62 is set to hold the DMA instruction (event D3) in the queue until the line fill operation is completed. The DMA instruction (event D3) is then processed after the line fill operation is completed. In this manner, ECU 50 prevents possible race conditions without the need for a data coherent bus.

In a preferred embodiment, all DMA requests are moved ahead of core logic unit instructions regardless of the memory address they access. This scheme slows down processing of the core instructions somewhat, but increases the rate at which DMA requests are handled. The increase in DMA request processing efficiency outweighs the slight slow down in processor performance especially since, as previously discussed, many external I/O devices are real-time devices. In another embodiment, it is possible to implement an address comparison mechanism that compares the address of an incoming DMA request to the address of core instructions in the queue. Only DMA requests that access an identical address accessed by a queued core instruction are moved up in priority in this embodiment.

There are four different scenarios in which simultaneous access may occur: 1) simultaneous DMA read and processor load instructions; 2) simultaneous DMA write and processor load instructions; 3) simultaneous DMA read and processor store instructions; and 4) simultaneous DMA write and processor store instructions. The procedures the present invention implements in each of these four scenarios, including the procedures used to maintain data coherency, are described in detail below.

Simultaneous DMA Read and Processor Load Operations:

In this scenario, no data is being written to memory so there are no significant data coherency issues. Whichever operation references the memories first, reads the data first from either the cache memories (in the event of a cache hit) or the main memory (in the event of a cache miss). The second arriving instruction references the data upon completion of the first instruction.

Simultaneous DMA Write and Processor Load Operations:

In the event of a cache hit during simultaneous DMA write and processor load operations, there is no coherency problem. If the Processor load operation arrives first and the cache address is in the "modified" state, the load data is returned and then the DMA writes to the cache. If the cache address is in the "exclusive" state, the load data is returned and the DMA write invalidates the level two and one cache locations. If it is the DMA write operation that arrives at cache 46 first, the processor load instruction is held until the DMA write operation is completed. The DMA write operation will write directly to cache 46 if the status bits associated with the memory address indicated the data was "modified" Otherwise, if the data was marked "exclusive," the DMA write will invalidate the cache location (and level one cache line as appropriate) and write to main memory.

If the DMA write operation arrives first and a cache miss occurs, the load operation reads the new data stored in main memory after completion of the write operation. A race condition is possible if the processor load operation arrives before the DMA write instruction and a cache miss occurs. As described, the present invention prevents such a race condition by implementing a rule that always allows a DMA operation to access cache 46 first when both a DMA operation and core logic operation simultaneously snoop on the cache. All downstream access of the same address, i.e., access to the same address in main memory 48 is also blocked until the line fill operation is complete. Thus, DMA requests have higher priority to main memory 48 than requests from the core logic unit. The DMA-first rule is carried out by arbitration logic (e.g., status bits) within ECU 50. ECU 50 also incorporates an address comparison circuit to block downstream access of a subsequent instruction to the same address until the DMA request is serviced.

Figure 5:
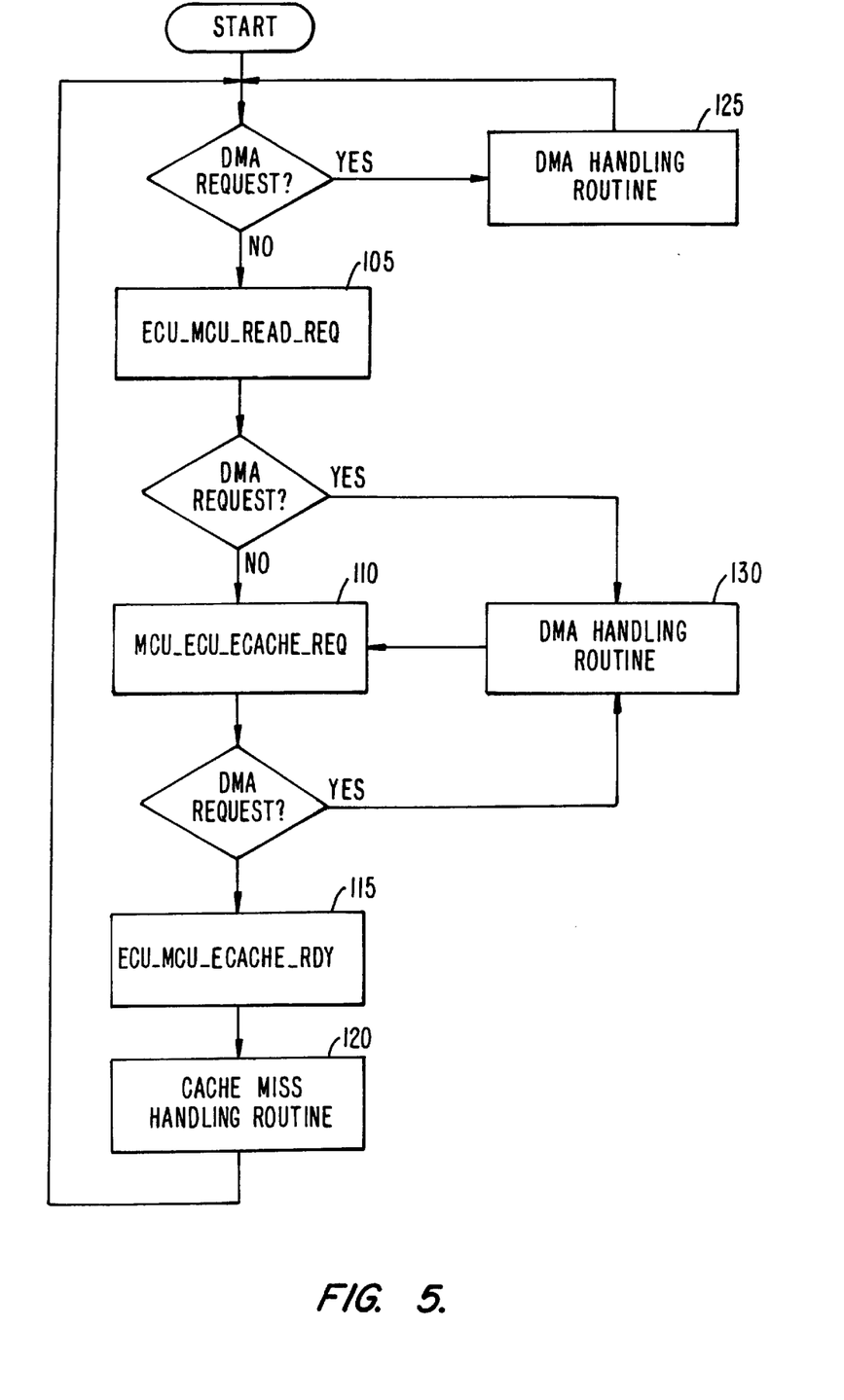
FIG. 5 is a flowchart illustrating the handshaking routine between the external cache and memory controllers before completion of a line fill operation in the processor shown in FIG. 2.

If the processor load operation is already in the process of a line fill, however, the DMA operation is held until after the line fill operation is complete. FIG. 5, which is a flow chart illustrating the handshaking logic involved between ECU 50 and memory controller 52 in such an operation, shows when the DMA operation should be held. To better understand FIG. 5, the typical handshaking process between the ECU and memory controller in the event of a cache miss is first described with reference to some of the steps in FIG. 5.

In a standard cache miss situation, once ECU 50 determines that the required address is not stored in cache 46 (a cache miss), the ECU starts a handshaking routine with memory controller 52. The first step of the handshaking routing sends a signal (ecu_mcu_read_req) from ECU 50 to memory controller 52 to determine if the memory controller is ready to access main memory 48 (FIG. 5, step 105). When it is ready, memory controller 52 responds with an indicative signal (mcu_ecu_ecache_req) (Step 110) over an mcu_ecache_req line. When ECU 50 receives this signal and is ready to transfer data to the memory controller, ECU 50 sends back another signal (ecu_mcu_ecache_rdy) over an ecu_ecache_rdy line (step 115) and begins the data transfer or line fill operation part of step 120.

Thus, as shown in FIG. 5, ECU 50 determines whether or not to stop the data transfer based on whether or not the above handshaking routine is completed. If a DMA request occurs anytime during the handshaking routine before step 115 is completed, the process is interrupted and the DMA request is handled (step 125 or 130) by moving the request in front of the instruction from processor 35. If the DMA request occurs after step 115, the request is held until completion of the line fill operation that is part of the miss handling routine in step 120.

The various possible states of the mcu_ecache_req, ecu_ecache_rdy and dma_req lines during this operation are listed in Table 1 below. In Table 1, the status of processor 35 is described as a function of the state (asserted or deasserted) of each of the mcu_ecahe_req, ecu_ecahe_rdy and dma_req lines. Most of the entries are self explanatory within the Processor Status column of the table and for convenience and reference they are related to the steps in FIG. 5 as appropriate. The last entry of Table 1 (mcu_ecahe_req: deasserted; ecu_ecahe_req: asserted) is an illegal condition because the ecu_ecahe_req line is only asserted in response to the assertion of the mcu_ecach_req line. In the event that the dma_req line is asserted when the mcu_ecahe_req line is also asserted, the mcu_ecahe_req line is deasserted in the subsequent clock cycle.

TABLE 1

DESCRIPTION OF THE STATUS OF PROCESSOR 35

| mcu_ecache_req | ecu_ecache_rdy | dma_req | Processor Status |
|---|---|---|---|
| 0 | 0 | 0 | Idle Condition |
| 1 | 0 | 0 | Memory Controller 52 trying to initiate/complete line fill operation (FIG. 3, step 110) in response to earlier request from ECU 50 |
| 1 | 1 | 0 | ECU 50 replies that line fill operation can get started (FIG. 3, step 115) |
| 1 | 0 | 1 | Memory controller 52 aborts attempted line fill operation because of arrival of DMA request |
| 1 | 1 | 1 | ECU guarantees this scenario will not happen because DMA request is held if ECU already replied that line fill operation can get started (FIG. 3, step 115) |
| 0 | 0 | 1 | DMA request is sent to idle memory controller 52 |
| 0 | 1 | x | Illegal condition |

An additional task performed along with moving up the priority of a DMA request in the preferred embodiment of the present invention includes a step of completing all pending writeback requests that may be present in a victim buffer (not shown) before the DMA request is executed. The victim buffer is a buffer in memory controller 52 that holds lines of back data (data moved out of cache 46 that needs to be preserved in main memory 48) thereby providing main memory 48 with an appearance that it can accept write back data faster than it actually can. It is possible in other embodiments of the present invention to hold the write back data until after the DMA request has been processed. In these embodiments, however, writebacks to the same address should still be completed before the DMA request.

Simultaneous DMA Read and Processor Store Instructions:

As with simultaneous DMA read and processor store operations, there is no coherency problem during simultaneous DMA read and processor store operations. In the event of a cache hit, if the DMA read operation arrives first, the old data stored in the cache is read out and before the processor store operation updates it. If the Processor store operation arrives first, the DMA read operation ends up reading the new data just written into the cache.

If the DMA read operation arrives first and a cache miss occurs, the read operation reads the old data stored in main memory before the store operation. No race condition is possible because as previously stated, CPU core logic unit 42 performs a write allocate operation in writing to memory 48 as part of the processor store instruction. That is, first a line fill operation is stared and the data stored in the selected address is read from memory 48 into cache 46. After that step is completed, core logic unit 42 writes directly to cache 46 rather than memory 48.

In the scenario when a processor store operation arrives first and a cache miss occurs, a race condition is not a problem, but the present invention maintains consistency by still implementing the DMA-first rule in the same manner as described above with respect to the simultaneous DMA write/processor load operations. That is, upon the processor store operation cache miss, ECU 50 sends an ecu_mcu_ read_req message to the memory controller. Whether or not the DMA read is moved in front of the request depends on whether or not the handshaking routine is completed before the DMA write operation arrives as shown in FIG. 5. In an alternative embodiment, DMA read requests are not advanced in priority and moved in front of core logic unit instructions —only DMA write requests are so prioritized.

Simultaneous DMA Write and Processor Store Instructions:

In the event of a cache hit during simultaneous DMA write and processor store operations, there is also no coherency problem. If the Processor store operation arrives first it is completed, putting the address line in cache 46 in the "modified" state. The DMA write operation ends then writes new data in the cache. When the DMA write operation arrives first, how it is handled depends on the status of the cache address. If the address is marked "exclusive," the DMA write will invalidate the cache line (and the level one cache line as appropriate) and write data directly to the main memory. Thus, when the processor store snoops on cache 46, it will get a miss and ECU 50 will perform the appropriate miss handling routine. If the address is marked "modified," the DMA will write to the cache and then, after completion of the DMA write, the processor will also write to the address.

If the DMA write operation arrives first and a cache miss occurs, the DMA write operation will write to main memory before the processor store operation does. A race condition is possible if the processor store operation arrives first and a cache miss occurs. The present invention prevents such a problem and maintains consistency by moving the DMA write ahead of the processor store. Such a situation is handled in the same manner as described above with respect to the simultaneous DMA write/processor load operations. That is, upon the processor store operation cache miss, ECU 50 sends an ecu_mcu_read req message to the memory controller. Whether or not the DMA write is moved in front of the request depends on whether or not the handshaking routine is completed before the DMA write operation arrives as shown in FIG. 5.

Having fully described several embodiments of the present invention, many other equivalents or alternatives will be apparent to those skilled in the art. These equivalents and alternatives are intended to be included within the scope of the present invention.

What is claimed is:

1. A single central processing unit comprising:
   a core logic unit; and
   an integrated input/output system coupled to said core logic unit and configured to exchange data, without the use of an on bus, with an external memory, an external cache and an external input/output device, said integrated input/output system also configured to prevent a race condition between an instruction from said core logic unit and a direct memory access (DMA) request from said external input/output device that both reference a same memory location by moving said DMA request in front of said instruction and holding said instruction until said DMA request is serviced.

2. The single central processing unit of claim 1 wherein said integrated input/output system comprises:
   an external cache controller (ECU), coupled to said core logic unit and configured to exchange data with said external cache;
   a memory control unit, directly coupled to said external cache controller and configured to exchange data with said external memory; and
   and a bus interface unit, directly coupled to said external cache controller and configured to exchange data with said external input/output device.

3. The single central processing unit of claim 2 wherein said ECU is configured to, in the event of a cache miss, move a DMA request that arrives at said ECU in front of an instruction from said core logic unit that is stored in an ECU queue.

4. The single central processing unit of claim 3 wherein said ECU is configured to move only said DMA request in front of said instruction from said core logic unit when said instruction from said core logic unit is waiting in said ECU queue within said ECU.

5. The single central processing unit of claim 3 wherein said DMA request is moved in front of said instruction when said instruction has requested access to said external memory, but is not yet involved in a line fill operation.

6. The single central processing unit of claim 4 wherein said ECU is further configured to hold said DMA request when an instruction that arrived at said ECU from said core logic unit is in the process of a line fill operation.

7. The single central processing unit of claim 6 wherein said ECU is configured to complete all pending writeback requests to said external cache before said DMA request is executed.

8. The single central processing unit of claim 6 wherein said ECU holds said DMA request by setting a status bit in said ECU queue.

9. The single central processing unit of claim 6 wherein said external cache is a second level cache and wherein said core logic unit further comprises a first level, internal cache.

10. The single central processing unit of claim 9 wherein said ECU further preserves data integrity by writing through data from said first level cache to said second level cache when said first level cache is updated.

11. A computer system that includes the single processing unit of claim 1.

12. A computer system comprising:
   a cache memory;
   a main memory;
   a bus;
   at least one input/output device coupled to said external bus; and
   a single central processing unit, coupled to said cache memory, to said main memory and to said external bus, said single central processing unit including:
      a core logic unit; and
      an integrated input/output system coupled to said core logic unit, said integrated input/output system including:
         (i) an external cache controller (ECU), coupled to said core logic unit and to said cache, said ECU configured to exchange data with said cache memory;
         (ii) an memory control unit, directly coupled to said ECU and to said main memory, said memory control unit configured to exchange data with said main memory; and
         (iii) and an external bus interface unit, directly coupled to said ECU without an intervening on-hip bus and coupled to said external bus, said external bus interface unit configured to exchange data with said at least one external input/output device over said external bus;

wherein said integrated input/output system is configured to prevent a race condition between an instruction from said core logic unit and a direct memory access (DMA) request from said external input/output device that both reference a same memory location by moving said DMA request in front of said instruction and holding said instruction until said DMA request is serviced.

13. A method of preventing race conditions in an integrated processor having a central processing unit and an integrated input/output system on a single chip, said method comprising the steps of:

providing a bus interface unit as part of said integrated input/output system to interface to an external bus and to control the exchange of data with external input/output devices;

providing an external cache controller as part of said integrated input/output system to interface to an external cache without the use of an on bus system;

providing a memory controller as part of said integrated input/output system to interface to an external main memory without the use of an on bus system;

simultaneously receiving first and second instructions at said cache controller, said first instruction being an instruction to access memory from said central processing unit and said second instruction being a direct memory access (DMA) instruction from an external input/output device coupled to said bus interface unit; and implementing a procedural rule to move said DMA instruction in front of said first instruction in execution order thereby preventing a race condition between said first instruction and said DMA instruction, said procedural rule being.

14. The method of claim 13, wherein said procedural rule further include the step of if said first instruction is in a line fill operation, holding said DMA instruction until said line fill operation is completed.

15. The method of claim 14 wherein said fit instruction is held by setting a status bit in a queue in said external cache controller.

16. The method of claim 13 wherein pending writeback requests to said external cache are completed before said DMA instruction is serviced.

17. The method of claim 13 wherein said bus interface unit interfaces with a bus implementing a PCI bus protocol.

18. A single central processing unit comprising:

a core logic unit; and an integrated input/output system coupled to said core logic unit and configured to exchange data, without the use of an on chip bus, with an external memory, an external cache and an external input/output device, said integrated input/output system also configured to prevent a race condition between an instruction from said core logic unit and a direct memory access (DMA) request from said external input/output device that both reference a same memory location by moving said DMA request in front of said instruction and holding said instruction until said DMA request is serviced, wherein said integrated input/output system is configured to implement a dynamic priority scheme to prevent race conditions.

\* \* \* \* \*

UNITED STATES PATENT AND TRADEMARK OFFICE
CERTIFICATE OF CORRECTION

PATENT NO. : 5,893,153
DATED : April 6, 1999
INVENTOR(S) : TZENG et al.

It is certified that error appears in the above-indentified patent and that said Letters Patent is hereby corrected as shown below:

In the claims:

Claim 1, Column 9, line 50, after "single" insert "-chip";
Claim 1, Column 9, line 54, after "on", insert "-chip";
Claim 2, Column 9, line 63, after "single" insert "-chip";
Claim 3, Column 10, line 7, after "single" insert "-chip";
Claim 4, Column 10, line 12, after "single" insert "-chip";
Claim 5, Column 10, line 17, after "single" insert "-chip";
Claim 6, Column 10, line 21, after "single" insert "-chip";
Claim 7, Column 10, line 25, after "single" insert "-chip";
Claim 8, Column 10, line 29, after "single" insert "-chip";
Claim 9, Column 10, line 32, after "single" insert "-chip";
Claim 10, Column 10, line 35, after "single" insert "-chip";
Claim 11, Column 10, line 39, after "single" insert "-chip";
Claim 12, Column 10, line 47, after "single" insert "-chip";
Claim 12, Column 10, line 49, after "single" insert "-chip";
Claim 12, Column 10, line 58, delete "an" and insert therefore "a";
Claim 12, Column 10, line 64, delete "on-hip" and insert therefore "on-chip";
Claim 13, Column 11, line 19, after "on" insert "-chip";
Claim 13, Column 11, line 22, after "on" insert "-chip";
Claim 14, Column 12, line 3, after "13" delete ".";
Claim 14, Column 12, line 4, delete "include" and insert therefore "includes";
Claim 15, Column 12, line 7, delete "fit" and insert therefore "first";
Claim 18, Column 12, line 15, after "single" insert "-chip";

UNITED STATES PATENT AND TRADEMARK OFFICE
CERTIFICATE OF CORRECTION

PATENT NO. : 5,893,153
DATED : April 6, 1999
INVENTOR(S) : TZENG et al.

It is certified that error appears in the above-indentified patent and that said Letters Patent is hereby corrected as shown below:

Claim 18, Column 12, line 19, after "on" insert "-chip".

Signed and Sealed this

Second Day of November, 1999

Attest:

Q. TODD DICKINSON

*Attesting Officer*   Acting Commissioner of Patents and Trademarks